United States Patent [19]

Lutter et al.

[11] Patent Number: 5,059,633

[45] Date of Patent: Oct. 22, 1991

[54] PREPARATION OF FLEXIBLE POLYURETHANE FOAMS HAVING LOW COMPRESSIVE STRENGTH AND BLOCK POLYOXYPROPYLENEPOLYOXYETHYLENEPOLYOL MIXTURES WHICH CAN BE USED FOR THIS PURPOSE

[75] Inventors: Heinz-Dieter Lutter, Neckargemuend; Werner Hinz, Frankenthal; Walter Decker, Ludwigshafen; Reinhard Leppkes, Bobenheim-Roxheim; Erhard Reich, Damme; Reinhard Peters, Munich; Volker Haase, Adelzhausen; Michael Lugmayr, Groebenzell, all of Fed. Rep. of Germany

[73] Assignee: BASF Aktiengesellschaft, Ludwigshafen, Fed. Rep. of Germany

[21] Appl. No.: 619,380

[22] Filed: Nov. 28, 1990

[30] Foreign Application Priority Data

Dec. 21, 1989 [DE] Fed. Rep. of Germany ....... 3942329

[51] Int. Cl.$^5$ ............................................. C08G 18/14
[52] U.S. Cl. .................................... 521/160; 521/174; 521/176; 521/914; 252/182.25; 252/182.27
[58] Field of Search .............. 521/160, 174, 176, 914; 252/182.25, 182.27

[56] References Cited

U.S. PATENT DOCUMENTS 4,385,133  5/1983  Alberino et al. .................. 521/914

Primary Examiner—Maurice J. Welsh
Attorney, Agent, or Firm—Martin P. Connaughton

[57] ABSTRACT

Flexible polyurethane foams having low compressive strength and relatively good tensile strength are prepared by reacting a) a block polyoxypropylenepolyoxyethylenepolyol mixture which has a hydroxyl number of from 14 to 65, contains from 2 to 9% by weight, based on the weight of the polyoxypropylene units, of ethylene oxide units bonded in the terminal position and is prepared by anionic polymerization of the alkylene oxides with an initiator mixture having an average functionality of from 2.3 to 2.8 and consisting of water and glycerol and/or trimethylolpropane, or a mixture of these block polyoxypropylenepolyoxyethylenepolyol mixtures with bi- and/or trifunctional polyoxypropylenepolyoxyethylenepolyols having a hydroxyl number of from 20 to 70, and b) if required, low molecular weight chain extenders with c) organic and/or modified organic polyisocyanates in the presence of d) catalysts, e) blowing agents, preferably water, and if required, f) assistants and/or additives.

10 Claims, No Drawings

PREPARATION OF FLEXIBLE POLYURETHANE FOAMS HAVING LOW COMPRESSIVE STRENGTH AND BLOCK POLYOXYPROPYLENEPOLYOXYETHYLENEPOLYOL MIXTURES WHICH CAN BE USED FOR THIS PURPOSE

The present invention relates to a process for the preparation of flexible polyurethane foams having low compressive strength and relatively good tensile strength by reacting a) special block polyoxypropylenepolyoxyethylenepolyol mixtures having a hydroxyl number of from 14 to 65 and containing from 2 to 9% by weight of ethylene oxide units bonded in the terminal position, which in turn are obtained using an initiator mixture having an average functionality of from 2.3 to 2.8 and consisting of water and glycerol or trimethylolpropane or of water, glycerol and trimethylpropane, and b) if required, low molecular weight chain extenders with organic and/or modified organic polyisocyanates in the presence of catalysts (d), blowing agents (e), assistants and/or additives (f), and the block polyoxypropylenepolyoxyethylenepolyol mixtures which can be used for this purpose.

The preparation of flexible polyurethane (abbreviated below to PU) foams by reacting relatively high molecular weight polyhydroxy compounds and, if required, chain extenders with organic polyisocyanates is known and described in many patent and other publications.

Examples are Kunststoff-Handbuch, Volume VII, Polyurethane, Carl Hanser Verlag, Munich, 1st edition, 1966, edited by R. Vieweg and Dr. A. Höchtlen, and 2nd edition, 1983, edited by Dr. G. Oertel, and the monograph entitled Integralschaumstoffe by Dr. H. Piechota and Dr. H. Röhr, 1975, from the same publisher.

The following are usually used for the preparation of the flexible PU foams: polyesterpolyols and/or polyoxyalkylenepolyols based on 1,2-propylene oxide, ethylene oxide or mixtures thereof and mixtures of such polyoxyalkylenepolyols and graft polyoxyalkylenepolyols as relatively high molecular weight polyhydroxy compounds, alkanediols, oxyalkylene glycols or hydroxyl-containing and/or amino-containing low molecular weight compounds having a functionality of from 2 to 4, e.g. glycerol, trimethylolpropane or alkanolamines, as chain extenders, and commercial toluylene diisocyanates (TDI), diphenylmethane diisocyanate isomers (MDI), mixtures of diphenylmethane diisocyanates and polyphenylpolymethylene polyisocyanates (crude MDI) and mixtures of crude MDI and TDI as organic polyisocyanates.

By a suitable choice of the components and the ratios thereof, it is possible to obtain flexible PU foams having very good mechanical properties, in particular high tensile strength and high compressive strength.

According to DE-C-1520737 (U.S. Pat. No. 3,336,242), PU foams having an open cell structure can be prepared by a one-stage process by reacting polyisocyanates with polyoxypropylenepolyoxyethylenetriols which have molecular weights of from 3,000 to 8,000 and contain from 3 to 5% by weight of bonded ethylene oxide as the terminal block and bonded glycerol and the initiator molecule.

Very flexible PU foams are obtained, according to GB-A-1 079 105, from a polyetherpolyol and a polyetherpolyol mixture having a hydroxyl number of from 70 to 170, which contains a trifunctional polyoxyalkylenepolyol, for example oxypropylated glycerol, and not more than 40% by weight of a polyoxyalkylene glycol, e.g. oxypropylated ethylene glycol, and an organic polyisocyanate, preferably TDI, in the presence of water and a fluorochlorohydrocarbon, preferably trichlorofluoromethane, as the blowing agent.

Flexible PU foams are also described in GB-A-1 064 576. According to this patent, organic diisocyanates, preferably TDI, are reacted, in the presence of water, with a mixture of 50 to 90% by weight of a polyoxyalkylenetriol having a hydroxyl number of from 30 to 170 and from 10 to 50% by weight of a polyoxyalkylenediol having a hydroxyl number of from 40 to 110, the mixture containing from 10 to 65% of primary hydroxyl groups.

The products described have good mechanical properties, in particular a high compressive strength and sag factor.

It is an object of the present invention to prepare a flexible PU foam having low compressive strength. It is intended to dispense completely or substantially with the use of fluorochlorohydrocarbons, which are suspected of causing damage to the ozone layer, as blowing agents, without adversely affecting the other mechanical properties of the resulting foams, in particular the tensile strength.

The organic polyisocyanates used should preferably be the sparingly volatile, unmodified or modified MDI isomers or crude MDI.

We have found that this object is achieved, surprisingly, by the use of novel block polyoxypropylenepolyoxyethylenepolyol mixtures or mixtures of these block polyoxypropylenepolyoxyethylenepolyol mixtures with di- and/or trifunctional polyoxypropylenepolyoxyethylenepolyols for the preparation of the flexible PU foams.

The present invention thus relates to a process for the preparation of flexible polyurethane foams having low compressive strength by reacting bifunctional or polyfunctional polyoxyalkylenepolyols and a) bifunctional or polyfunctional polyoxyalkylenepolyols and b) if required, low molecular weight chain extenders with c) organic and/or modified organic polyisocyanates, in the presence of d) catalysts, e) blowing agents and, if required, f) assistants and/or additives, wherein the polyoxyalkylenepolyols (a) used are a block polyoxypropylenepolyoxyethylenepolyol mixture which has a hydroxyl number of from 14 to 65, contains from 2 to 9% by weight, based on the weight of the polyoxypropylene units, of ethylene oxide units bonded in the terminal position, and was prepared by anionic polymerization, at elevated temperatures, of 1,2-propylene oxide with an initiator mixture having an average functionality of from 2.3 to 2.8 and consisting of water and glycerol and/or trimethylolpropane, and polymerization of ethylene oxide with the resulting polyoxypropylene adduct.

In a preferred embodiment, the flexible PU foams having low compressive strength are prepared by a two-stage process wherein 1. in a first reaction stage, 1,2-propylene oxide is polymerized with an initiator mixture having an average functionality of from 2.3 to 2.8 and consisting of water and glycerol and/or trimethylolpropane, in the presence of at least one basic catalyst, at elevated temperatures, and ethylene oxide is polymerized with the resulting polyoxypropylene adduct, in an amount such that the resulting block polyoxypropylenepolyoxyethylenepolyol mixture has a hydroxyl number of from 14 to 65 and contains from 2 to 9% by weight, based on the weight of the polyoxypropylene units, of ethylene oxide units bonded in the terminal position, and
2. in a second reaction stage,
   a) the resulting block polyoxypropylenepolyoxyethylenepolyol mixture and
   b) if required, low molecular weight chain extenders are reacted with
   c) organic and/or modified organic polyisocyanates in the presence of
   d) catalysts,
   e) blowing agents
   and, if required,
   f) assistants and/or additives.

Advantageous and therefore preferably used embodiments of the novel process form the subjects of claims 3 to 8.

The present invention furthermore relates to block polyoxypropylenepolyoxyethylenepolyol mixtures which have a hydroxyl number of from 14 to 65, contain from 2 to 9% by weight, based on the weight of the polyoxypropylene units, of ethylene oxide units bonded in the terminal position and are prepared by anionic polymerization, at elevated temperatures, of 1,2-propylene oxide with an initiator mixture having an average functionality of from 2.3 to 2.8 and consisting of water and glycerol and/or trimethylolpropane, and polymerization of ethylene oxide with the resulting polyoxypropylene adduct as claimed in claim 9, and novel polyoxyalkylenepolyol mixtures containing or, preferably, consisting of
   ai) from 10 to 60% by weight of a block polyoxypropylenepolyoxyethylenepolyol mixture having the features stated in claim nine, and
   aii) from 40 to 90% by weight of at least one di- and/or trifunctional polyoxypropylenepolyoxyethylenepolyol having a hydroxyl number of from 20 to 70,
the percentages being based on the total weight.

Since the use of water in the reaction with the organic polyisocyanates for the formation of carbon dioxide as a blowing agent results in the formation of urea groups, which increase the compressive strength of the urethane-containing foam produced, it was surprising and could not be foreseen, that by using the novel block polyoxypropylenepolyoxyethylenepolyol mixtures, not only is this behavior compensated but rather flexible PU foams having low compressive strength are obtained, the said foams possessing good mechanical properties in terms of the tensile strength, elongation, tear propagation strength and compressive set.

Regarding the preparation of the novel block polyoxypropylenepolyoxyethylenepolyol mixtures which can be used according to the invention and the other starting components which can be used for the novel process, the following may be stated specifically:

a) As stated above, the novel block polyoxypropylenepolyoxyethylenepolyol mixtures have a hydroxyl number of from 14 to 65, preferably from 14 to 40, in particular from 20 to 35 and contain from 2 to 9, preferably from 3 to 8, in particular from 5 to 7, % by weight, based on the weight of the polyoxypropylene units, of ethylene oxide units bonded in the terminal position. Increasing the hydroxyl number above 65 or increasing the ethylene oxide content in the terminal block to values greater than 10% by weight results in increasing hardening of the flexible PU foams, associated with an increase in the compressive strength. If, on the other hand, the content of ethylene oxide is reduced to less than 2% by weight or polyoxypropylenepolyols are used, the reactivity of the polyoxyalkylenepolyols is greatly reduced and at the same time their sensitivity is substantially increased, so that the flexible PU foam systems prepared therefrom can be processed relatively easily only in narrow reaction ranges.

Furthermore, the type of initiator molecules and the average functionality of the initiator mixture are important for the preparation of the novel block polyoxypropylenepolyoxyethylenepolyols, the said functionality being from 2.3 to 2.8, preferably from 2.3 to 2.7, in particular from 2.5 to 2.7. The initiators used are mixtures of water and trimethylolpropane or glycerol, of water, trimethylolpropane and glycerol and preferably of water and glycerol. Advantageously, the water and glycerol and/or trimethylolpropane are used in molar ratios of from 2.3:1 to 1:4, preferably from 2:1 to 1:2.5, in particular from 1:1 to 1:2.5. If, instead of the initiator mixture suitable according to the invention, trihydric alcohols are used as the initiator, flexible PU foams having greater compressive strength are obtained; when bifunctional initiators are used, flexible PU foams having low compressive strength are likewise obtained, but these foams also have insufficient tensile strength.

The novel block polyoxypropylenepolyoxyethylenepolyol mixtures are advantageously prepared by anionic polymerization of 1,2-propylene oxide with the initiator mixture and subsequent polymerization of ethylene oxide with the resulting polyoxypropylene adduct in the presence of a basic catalyst at elevated temperatures and under atmospheric or superatmospheric pressure. Examples of suitable catalysts are alkali metal hydroxides, such as sodium hydroxide or, preferably, potassium hydroxide, and alkali metal alcoholates, such as sodium methylate, sodium ethylate, potassium ethylate or potassium isopropylate. For the preparation of the block polyoxypropylenepolyoxyethylenepolyol mixtures, the glycerol and/or trimethylolpropane are first converted into the corresponding alcoholates. Depending on the type of catalyst used, the water formed is partially distilled off or the low boiling alcohol formed is completely distilled off. In a preferably used embodiment, the trimethylolpropane and/or, preferably, the glycerol are first converted into the alcoholate with complete removal of the resulting water or low boiling alcohol. Thereafter, an aqueous alkali metal hydroxide solution is incorporated in the alcoholate formed, in an amount required for obtaining the functionality, necessary according to the invention, of the initiator mixture. At from 90° to 150° C., preferably from 100° to 130° C., the 1,2-propylene oxide is then introduced at the rate at which it reacts, under atmospheric pressure or under superatmospheric pressure of from 1.1 to 20, preferably from 1.1 to 7, bar. After the end of the propoxylation, the terminal ethylene oxide block can be polymerized directly with ethylene oxide. In the preferably used preparation process, however, the unconverted 1,2-propylene oxide is completely distilled off under reduced pressure after the end of the propoxylation, and ethoxylation is then carried out under the abovementioned reaction conditions. Depending on the chosen temperature and pressure conditions, reaction times of from 4 to 30, preferably from 6 to 10, hours are required for the propoxylation and ethoxylation reactions. After the end of the ethoxylation, any excess, unreacted ethylene oxide is separated off at from 100° to 150° C. under reduced pressure.

The novel alkali metal-containing block polyoxypropylenepolyoxyethylenepolyol mixtures can be neutralized, for example, by the addition of an inorganic acid, e.g. sulfuric, phosphoric or carbonic acid, and organic acids, e.g. citric acid, acetic acid, formic acid, etc., or by an ion exchange resin and, if necessary, can be purified by a known method by adding an adsorbent.

The products obtained can be used directly or after storage for the preparation of the flexible PU foams having low compressive strength.

Instead of the novel block polyoxypropylenepolyoxyethylenepolyol mixtures (ai) which can be used according to the invention, it is also possible, for the gradual reduction of the compressive strength, to use mixtures of these block polyols (ai) and conventional polyoxyalkylenepolyols (aiii) for the preparation of the flexible PU foams by the novel process. For reasons relating to process engineering, the polyoxyalkylenepolyols (a) advantageously used are mixtures which contain or, preferably, consist of (ai) from 10 to 60, preferably from 20 to 50, % by weight of a block polyoxypropylenepolyoxyethylenepolyol mixture having a hydroxyl number of, preferably, from 14 to 40, in particular from 20 to 35 and containing preferably from 3 to 8, in particular from 5 to 7, % by weight, based on the weight of the polyoxypropylene units, of ethylene oxide units bonded in the terminal position, the average functionality of the initiator mixture, consisting of water and glycerol and/or trimethylolpropane, being preferably from 2.3 to 2.7, in particular from 2.5 to 2.7, and (aiii) from 40 to 90, preferably from 50 to 80, % by weight of at least one bi- and/or trifunctional polyoxypropylenepolyoxyethylenepolyol having a hydroxyl number of from 20 to 70, preferably from 30 to 56, the percentages being based on the total weight of (a).

The use of such mixtures of (ai) and (aiii) leads to an acceptable balance between very good processability of the formulations and good mechanical properties of the resulting flexible PU foams without, however, achieving the low compressive strengths as obtained when (ai) is used alone.

Polyoxypropylenepolyoxyethylenepolyols (aiii) suitable for this purpose can be prepared by known processes, for example by the anionic polymerization described above, in the presence of a basic catalyst and with the use of bi- and/or trifunctional initiators, or by cationic polymerization of 1,2-propylene oxide and ethylene oxide with a Lewis acid, such as antimony pentachloride, boron trifluoride etherate, etc., or bleaching earth as the catalyst.

Examples of suitable initiators are water, organic dicarboxylic acids, e.g. succinic, glutaric, adipic, phthalic and terephthalic acid, alkanolamines, such as ethanolamine, dialkanolamines, e.g. diethanolamine or diisopropanolamine, N-alkyldialkanolamines, e.g. N-methyl- and N-ethyldiethanolamine, trialkanolamines, such as triethanolamine or triisopropanolamine, and ammonia. Dihydric and trihydric alcohols, dialkylene glycols and mixtures thereof, e.g. ethanediol, 1,2- or 1,3-propanediol, diethylene glycol, dipropylene glycol, 1,4-butanediol, 1,6-hexanediol, glycerol and trimethylolpropane, are preferably used.

The polyoxypropylenepolyoxyethylenepolyols (aiii) can be used individually or in the form of mixtures, and the middle alkylene oxide units may be arranged either randomly or blockwise. However, polyoxypropylenepolyoxyethylenepolyols containing from 3 to 20, preferably from 5 to 18, % by weight, based on the total weight of the alkylene oxides, of ethylene oxide in the terminal block and containing more than 50%, preferably more than 60%, of primary hydroxyl groups are used in particular. Polyoxyalkylenepolyols of the stated type are described in, for example, DE-C-1 520 737 (U.S. Pat. No. 3,336,242) and DE-A-1 570 885 (GB-A-1 120 223).

b) To modify the mechanical properties of the flexible PU foams having low compressive strength, it may be advantageous to use low molecular weight chain extenders (b) for their preparation, in addition to the block polyoxypropylenepolyoxyethylenepolyols (ai) which can be used according to the invention or, preferably, mixtures of (ai) and bi- and/or trifunctional polyoxypropylenepolyoxyethylenepolyols (aiii).

Suitable agents of this type are polyfunctional, in particular bifunctional and trifunctional, compounds having molecular weights of from 18 to about 400, preferably from 62 to about 300. For example, di- and/or trialkanolamines, e.g. diethanolamine and triethanolamine, aliphatic diols and/or triols where the alkylene radical is of 2 to 6 carbon atoms, e.g. ethanediol, 1,4-butanediol, 1,5-pentanediol, 1,6-hexanediol, glycerol and/or trimethylolpropane, and low molecular weight ethoxylation and/or propoxylation products, prepared from the above-mentioned dialkanolamines, trialkanolamines, diols and/or triols, and aliphatic and/or aromatic diamines, such as 1,2-ethanediamine, 1,4-butanediamine, 1,6-hexanediamine, 2,3-, 2,3- and/or 2,6-toluylenediamine, 4,4'-diaminodiphenylmethane, 3,3'-di- and/or 3,3',5,5'-tetraalkyl-substituted 4,4'-diaminodiphenylmethanes, as initiators, and alkylene oxide or alkylene oxide mixtures are used.

Preferably used chain extenders (b) are dialkanolamines, diols and/or triols, in particular 1,6-hexanediol, diethanolamine, trimethylolpropane and glycerol or mixtures thereof.

The chain extenders (b), which are preferably also used for the preparation of the flexible PU foams, can advantageously be employed in amounts such that there are from 0.01 to 8, in particular from 0.1 to 3, moles of chain extender (b) per mole of relatively high molecular weight compound (a) in the reaction mixture.

c) The known organic, for example aliphatic, cycloaliphatic, araliphatic, cycloaliphatic-aromatic and, preferably, aromatic di- and/or polyisocyanates are suitable for the preparation of the flexible PU foams having low compressive strength. Specific examples of aromatic polyisocyanates are mixtures of 4,4'- and 2,4'-MDI, crude MDI, advantageously containing not less than 35, preferably from 50 to 90, % by weight or more, based on the total weight of the mixture, of MDI isomers, and 2,4- and 2,6-toluylene diisocyanate and the corresponding commercial isomer mixtures, mixtures of toluylene diisocyanates and MDI and/or crude MDI, for example those containing from 30 to 90, preferably from 40 to 80, % by weight, of MDI, based on the total weight of the crude MDI.

Modified polyvalent isocyanates, i.e. products which are obtained by chemically reacting organic di- and/or polyisocyanates, are also suitable. Examples are di- and/or polyisocyanates containing ester, urea, biuret, allophanate, isocyanurate and, preferably, carbodiimide, uretonimide and/or urethane groups. Specific examples are urethane-containing prepolymers having an NCO content of from 14 to 2.8, preferably from 12 to 3.5, % by weight, or quasi-prepolymers having an NCO content of from 35 to 14, preferably from 34 to 22, % by weight, urethane-modified polyisocyanates obtained from toluylene diisocyanates having in particular an NCO content of from 34 to 28% by weight and those obtained from 4,4'-MDI, 4,4'- and 2,4'-MDI isomer mixtures or crude MDI having in particular an NCO content of from 28 to 22% by weight, based on the total weight, and are prepared by reacting diols, oxyalkylene glycols and/or polyoxyalkylene glycols having molecular weights of from 62 to 6,000, preferably from 134 to 4,200, with toluylene diisocyanates, 4,4'-MDI, MDI isomer mixtures and/or crude MDI, for example at from 20° to 110° C., preferably from 50° to 90° C., examples of oxyalkylene and polyoxyalkylene glycols, which may be used individually or as a mixture, being diethylene, dipropylene, polyoxyethylene, polyoxypropylene and polyoxypropylenepolyoxyethylene glycols, and polyisocyanates containing carbodiimide groups and/or isocyanurate groups, for example such polyisocyanates based on MDI isomers and/or toluylene diisocyanate.

However, mixtures of 4,4'- and 2,4'-MDI, crude MDI containing not less than 35% by weight, based on the total weight, of MDI, mixtures of 4,4'- and 2,4'-MDI and mixtures of 2,4- and 2,6-TDI, mixtures of crude MDI and mixtures of 2,4- and 2,6-TDI, urethane-containing polyisocyanate mixtures having and NCO content of from 28 to 14% by weight, based on the total weight, and based on MDI and/or crude MDI have, however, proven particularly useful and are therefore preferably used.

d) To accelerate the reaction of the block polyoxypropylenepolyoxyethylenepolyol mixtures, polyoxyalkylenepolyol mixtures of (ai) and (aiii) or, preferably, mixtures of (ai) or (ai) and (aiii), water as blowing agent (e) and, if required, chain extenders (b) with the organic polyisocyanates and/or modified polyisocyanates (c), polyurethane catalysts are usually incorporated in the reaction mixture. Preferably used catalysts are basic polyurethane catalysts, for example tertiary amines, such as dimethylbenzylamine, dicyclohexylmethylamine, dimethylcyclohexylamine, N,N,N',N'-tetramethyldiaminodiethyl ether, bis-(dimethylaminopropyl)-urea, N-methyl- and N-ethylmorpholine, dimethylpiperazine, N-dimethylaminoethylpiperidine, 1,2-dimethylimidazole, 1-azabicyclo[2.2.0]octane, dimethylaminoethanol, 2-(N,N-dimethylaminoethoxy)-ethanol, N,N',N''-tris-(dialkylaminoalkyl)-hexahydrotriazine, e.g. N,N',N''-tris-(dimethylaminopropyl)-s-hexahydrotriazine and in particular triethylenediamine. However, metal salts, such as iron(II) chloride, zinc chloride, lead octoate and preferably tin salts, such as tin dioctoate, tin diethylhexanoate and dibutyltin dilaurate, and in particular mixtures of tertiary amines and organic tin salts, are also suitable. Advantageously, from 0.1 to 10, preferably from 0.3 to 3, % by weight of a catalyst based on tertiary amines and/or from 0.01 to 0.5, preferably from 0.03 to 0.25, % by weight of metal salts are used, the percentages being based on the weight of the polyoxyalkylenepolyols (a).

e) Blowing agents (e) which can be used for the preparation of the flexible PU foams preferably include water, which reacts with isocyanate groups with formation of carbon dioxide. The amounts of water which are advantageously used are from 0.1 to 8, preferably from 1.5 to 5.0, in particular from 2.5 to 3.5, parts by weight per 100 parts by weight of the polyoxyalkylenepolyols (a).

It is also possible to use physical blowing agents as a mixture with water. Liquids which are inert to the organic, unmodified or modified polyisocyanates (c) and have boiling points of less than 100° C., preferably less than 50° C., in particular from −50° to 30° C., under atmospheric pressure so that they vaporize under the effect of the exothermic polyaddition reaction are suitable. Examples of such liquids which can be preferably used are hydrocarbons, such as n- and isopentane, preferably industrial mixtures of n- and isopentanes, n- and isobutane and propane, ethers, such as furan, dimethyl ether and diethyl ether, ketones, such as acetone and methyl ethyl ketone, alkyl carboxylates, such as methyl formate, dimethyl oxalate and ethyl acetate, and halohydrocarbons, such as methylene chloride, dichloromonofluoromethane, difluoromethane, trifluoromethane, difluoroethane, tetrafluoroethane and heptafluoropropane. Mixtures of these low boiling liquids with one another and/or with other substituted or unsubstituted hydrocarbons can also be used. Organic carboxylic acids, e.g. formic acid, acetic acid, oxalic acid and ricinoleic acid, and carboxyl-containing compounds are also suitable.

The amount of physical blowing agents required in addition to water can be determined in a simple manner as a function of the desired foam density and is about 0–25, preferably 0–15, parts by weight per 100 parts by weight of the polyoxyalkylenepolyols (a). It may be advantageous to mix the unmodified or modified polyisocyanates (c) with the inert physical blowing agent and thus to reduce the viscosity.

f) It is also possible for assistants and/or additives (f) to be incorporated in the reaction mixture for the preparation of the flexible PU foams. Examples are surfactants, foam stabilizers, cell regulators, fillers, dyes, pigments, flameproofing agents, hydrolysis stabilizers, and fungistatic and bacteriostatic substances.

Examples of suitable surfactants are compounds which promote homogenization of the starting materials and may also be suitable for regulating the cell structure. Examples are emulsifiers, such as the sodium salts of castor oil sulfates or of fatty acids, and salts of fatty acids and amines, for example diethylammonium oleate, diethanolammonium stearate and diethanolammonium ricinoleate, salts of sulfonic acids, for example alkali metal or ammonium salts of dodecylbenzene- or dinaphthylmethanedisulfonic acid and ricinoleic acid; foam stabilizers, such as siloxane/oxyalkylene copolymers and other organopolysiloxanes, oxyethylated alkylphenols, oxyethylated fatty alcohols, liquid paraffins, castor oil esters and ricinoleic esters, Turkey red oil and peanut oil, and cell regulators, such as paraffins, fatty alcohols and dimethylpolysiloxanes. Furthermore, oligomeric polyacrylates having polyoxyalkylene and fluoroalkane radicals as side groups are suitable for improving the emulsifying effect, the cell structure and/or stabilization of the foam. The surfactants are usually used in amounts of from 0.01 to 5 parts by weight per 100 parts by weight of the polyoxyalkylenepolyols (a).

Fillers, in particular reinforcing fillers, are the conventional organic and inorganic fillers, reinforcing agents, weighting agents, agents for improving the abrasion behavior in surface coatings, coating materials, etc. Specific examples are inorganic fillers, such as silicate minerals, for example sheet silicates, such as antigorite, serpentine, hornblendes, amphibole, chrisotile, zeolites and talc; metal oxides, such as kaolin, aluminas, aluminum silicate, titanium oxides and iron oxides, metal salts, such as chalk and barite, and inorganic pigments, such as cadmium sulfide and zinc sulfide, as well as glass particles. Examples of suitable organic fillers are carbon black, melamine, rosin, cyclopentadienyl resins, and graft polymers.

The inorganic and organic fillers can be used individually or as mixtures and are advantageously incorporated in the reaction mixture in amounts of from 0.5 to 50, preferably from 1 to 40, % by weight, based on the weight of components (a) to (c).

Examples of suitable flameproofing agents are tricresyl phosphate, tris-(2-chloroethyl) phosphate, tris-(2-chloropropyl) phosphate, tris-(1,3-dichloropropyl) phosphate, tris-(2,3-dibromopropyl) phosphate and tetrakis-(2-chloroethyl) ethylene diphosphate.

In addition to the abovementioned halogen-substituted phosphates, inorganic flameproofing agents, such as red phosphorus, aluminum oxide hydroxide, antimony trioxide, arsenic oxide, ammonium polyphosphate and calcium sulfate, or cyanuric acid derivatives, e.g. melamine, or mixtures of at least two flameproofing agents, such as ammonium polyphosphates and melamine, and, if desired, starch can also be used for flameproofing the flexible PU foams prepared according to the invention. In general, it has proven advantageous to use from 5 to 50, preferably from 5 to 25, parts by weight of the stated flameproofing agents or mixtures thereof per 100 parts by weight of components (a) to (c).

Further information about the abovementioned other conventional assistants and additives can be obtained from the technical literature, for example the monograph by J. H. Saunders and K. C. Frisch, High Polymers, Volume XVI, Polyurethanes, Parts 1 and 2, Interscience Publishers 1962 and 1964, or Kunststoff-Handbuch, Polyurethane, Volume VII, Carl-Hanser-Verlag, Munich, Vienna, 1st and 2nd editions, 1966 and 1983.

For the preparation of the flexible PU foams, the organic, unmodified or modified polyisocyanates (c), the bifunctional or polyfunctional polyoxyalkylenepolyols (a) and, if required, chain extenders (b) are reacted in the presence of a catalyst (d), blowing agent (e) and, if required, assistants and/or additives (f) at from 0° to 100° C., preferably from 15° to 80° C., in ratios such that there are, per NCO group, from 0.5 to 2, preferably from 0.8 to 1.3 reactive hydrogen atoms, in particular about one reactive hydrogen atom, bonded to the starting components (a) and, where relevant, (b), and the molar ratio of the number of equivalents of water to the number of equivalents of NCO groups is from 0.5:1 to 5:1, preferably from 0.7:1 to 0.95:1, in particular from 0.75:1 to 0.85:1.

The flexible PU foams are advantageously prepared by the one-shot method, by mixing two components A and B, the starting components (a), (d), (e) and, if required, (b) and (f) being combined to give component A and starting component (c), if necessary as a mixture with (f) and inert, physical blowing agents, being used as component B. Since component A has a shelf life of not less than 6 months, components A and B need only be thoroughly mixed before preparation of the flexible PU foams. The reaction mixture can be expanded in open or closed molds; it is also suitable for the preparation of block foams.

The novel process is also suitable for the preparation of flexible PU molded foams. For this purpose, the reaction mixture is introduced at from 15° to 80° C., preferably from 30° to 65° C., into a thermostatable mold which is advantageously made of metal. The mold temperature is usually from 20° to 90° C., preferably from 35° to 70° C. The reaction mixture is allowed to harden in the closed mold with densification, the degrees of densification being, for example, from 1.1 to 8, preferably from 2 to 6, in particular from 2.2 to 4.

The flexible PU foams prepared by the novel process have densities of from 10 to 150, preferably from 20 to 70, g/l and possess low compressive strength in combination with good other mechanical properties, in particular tensile strength. An additional advantage is the high mechanical strength under stress at elevated temperatures and high atmospheric humidity.

The novel block polyoxypropylenepolyoxyethylenepolyol mixtures (ai) and polyoxyalkylenepolyol mixtures of (ai) and at least one bi- and/or trifunctional polyoxypropylenepolyoxyethylenepolyol (aii) are suitable for the preparation of flexible PU foams having low compressive strength. The flexible PU foams prepared by the novel process are used as seat upholstery in the automotive and furniture industries, and the flexible PU molded foams are employed as upholstery elements, for example as seat upholstery, arm rests, headrests, sun visors and safety panels in vehicle cabins, preferably in motor vehicles and aircraft.

EXAMPLES

Preparation of the block polyoxypropylenepolyoxyethylenepolyol mixtures (ai)

EXAMPLE 1

2.2 parts by weight of glycerol were initially taken in a reactor and were mixed with 1.9 parts by weight of a 47% strength by weight aqueous potassium hydroxide solution. To remove the water introduced and that produced during alcoholate formation, the mixture was dewatered under reduced pressure (0.1–0.01 bar) at 80° C. until a molar ratio of glycerol in glycerate form to water in the mixture was 1:2 (average functionality of the initiator mixture 2.33), this procedure taking about 1 hour. Thereafter, 188 parts by weight of 1,2-propylene oxide were added at 110° C. and a maximum pressure of 4.5 bar over a period of about 8 hours. After the end of the addition of the 1,2-propylene oxide and a subsequent reaction time of about 3 hours, the reaction mixture was stripped at 110° C. and 0.01 bar to remove the unconverted 1,2-propylene oxide.

12 parts by weight of ethylene oxide were then metered in at 115° C. and a maximum pressure of 5 bar over a period of 2 hours. After reaction of the ethylene oxide, the reaction mixture was again stripped under the abovementioned reaction conditions to remove the unconverted ethylene oxide, then neutralized with phosphoric acid and purified by a known method.

A block polyoxypropylenepolyoxyethylenepolyol mixture having a hydroxyl number of 30 and containing 6% by weight, based on the weight of the polymerized 1,2-propylene oxide units, of terminal ethylene oxide groups was obtained.

EXAMPLE 2

The procedure described was similar to that of Example 1, except that the water introduced with the potassium hydroxide solution and that produced during alcoholate formation was distilled off in an amount such that the reaction mixture contained glycerol in glycerate form and water in a molar ratio of 2:1 (average functionality of the initiator mixture 2.66).

A block polyoxypropylenepolyoxyethylenepolyol mixture having a hydroxyl number of 30 and containing 6% by weight, based on the weight of the polymerized 1,2-propylene oxide units, of terminal ethylene oxide units was obtained.

Preparation of flexible PU foams

EXAMPLE 3

Component A: Mixture consisting of
95.66 parts by weight of the block polyoxypropylenepolyoxyethylenepolyol mixture prepared according to Example 1,
3.24 parts by weight of water,
0.46 part by weight of a 33% strength by weight solution of triethylenediamine in dipropylene glycol,
0 12 part by weight of bis-(N,N-dimethylaminoethyl) ether,
0.46 part by weight of 2-(dimethylaminoethoxy)-ethanol and
0.06 part by weight of a silicone-based stabilizer (Tegostab ® B 4690 from Goldschmidt AG, Essen)

Component B: Crude MDI having an NCO content of 31.3% by weight, based on the total weight, containing 37% by weight of 4,4'-MDI and 2% by weight of 2,4'-MDI.

100 parts by weight of component A and 55 parts by weight of component B, corresponding to an NCO index of 100, were mixed thoroughly at 23° C. for 8 seconds.

720 g of the reaction mixture were introduced into a metal mold having the internal dimensions 40×40×10 cm and thermostated at 50° C., the mold was closed and the reaction mixture was allowed to expand.

After a molding time of 3 minutes, the resilient and flexible PU foam molding was removed from the mold. It had a density of 45 g/l according to DIN 53,420.

EXAMPLE 4

The procedure was carried out similarly to Example 3, except that, instead of the block polyoxypropylenepolyoxyethylenepolyol mixture according to Example 1, a mixture of this type prepared as described in Example 2 was used.

COMPARATIVE EXAMPLES I TO VI

Flexible PU foams were prepared similarly to Example 3, except that, instead of the novel block polyoxypropylenepolyoxyethylenepolyol mixtures (ai), the polyoxyalkylenepolyols below were used in an amount of 95.66 parts by weight in component A.

COMPARATIVE EXAMPLE I

Glycerol-initiated polyoxypropylenepolyoxyethylenepolyol having a hydroxyl number of 35 and containing 13% by weight, based on the total weight of the alkylene oxide units, of terminal polyoxyethylene groups.

COMPARATIVE EXAMPLE II

A polyoxypropylenepolyol initiated with glycerol and water in a molar ratio of 2:1 (average functionality of the initiator mixture 2.66) and having a hydroxyl number of 30. The foam structure formed collapsed.

COMPARATIVE EXAMPLE III

A polyoxypropylenepolyoxyethylenepolyol initiated with glycerol and water in a molar ratio of 2:1 and having a hydroxyl number of 30 and containing 20% by weight, based on the total weight of the alkylene oxide units, of terminal polyoxyethylene groups.

COMPARATIVE EXAMPLE IV

A polyoxypropylenepolyoxyethylenepolyol initiated with glycerol and having a hydroxyl number of 30 and containing 5% by weight, based on the total weight of the alkylene oxide units, of terminal polyoxyethylene groups.

COMPARATIVE EXAMPLE V

A polyoxypropylenepolyoxyethylenepolyol initiated with glycerol and water in a molar ratio of 2:1 and having a hydroxyl number of 30 and containing 13% by weight, based on the total weight of the alkylene oxide units, of terminal polyoxyethylene groups.

COMPARATIVE EXAMPLE VI

A polyoxypropylenepolyoxyethylene glycol initiated with 1,3-propanediol and having a hydroxyl number of 30 and containing 5% by weight, based on the total weight of the alkylene oxide units, of terminal polyoxyethylene groups.

The mechanical properties measured for the flexible PU foams prepared according to Examples 3 and 4 and Comparative Examples I to VI are summarized in the Table below.

TABLE

Mechanical properties of the flexible PU foams according to Examples 3 and 4 and Comparative Examples I to VI

| Examples | 1 | 2 | | | | | | |
|---|---|---|---|---|---|---|---|---|
| Comparative Examples | | | I | II | III | IV | V | VI |
| Tensile strength according to DIN 53,571 [kPa] | 50 | 56 | 80 | — | 106 | 58 | 83 | 45 |
| Elongation according to DIN 53,571 [%] | 68 | 54 | 62 | — | 64 | 61 | 64 | 66 |
| Tear propagation strength according to DIN 53,575 [N/mm] | 0.13 | 0.15 | 0.27 | — | 0.32 | 0.22 | 0.24 | 0.14 |

TABLE-continued

Mechanical properties of the flexible PU foams according to Examples 3 and 4 and Comparative Examples I to VI

| Examples<br>Comparative Examples | 1 | 2 | I | II | III | IV | V | VI |
|---|---|---|---|---|---|---|---|---|
| Compressive set according to DIN 53,572 [%] | 5.6 | 4.2 | 4.6 | — | 11.9 | 3.7 | 4.2 | 4.8 |
| Compressive strength according to DIN 53,577 at | | | | | | | | |
| 20% compression [kPa] | 2.6 | 2.4 | 4.7 | — | 4.1 | 4.8 | 4.0 | 1.9 |
| 40% compression [kPa] | 3.5 | 3.3 | 6.6 | — | 5.7 | 6.6 | 5.6 | 2.5 |
| 60% compression [kPa] | 5.8 | 5.7 | 11.2 | — | 9.8 | 11.7 | 9.3 | 4.3 |

EXAMPLE 5

The procedure was carried out similarly to Example 3, except that, instead of the block polyoxypropylenepolyoxyethylenepolyol mixture, 100 parts by weight of a mixture which consisted of from 0 to 100 parts by weight of the block polyoxypropylenepolyoxyethylenepolyol mixture according to Example 2 (ai2) and from 100 to 0 parts by weight of a polyoxypropylenepolyoxyethylenepolyol having a hydroxyl number of 35, containing 13% by weight, based on the total content of alkylene oxide units, of terminal ethylene oxide units and prepared using glycerol as the initiator (aii) were used.

The following compressive strengths at 40% compression, measured according to DIN 53,577, were determined for the flexible PU foams prepared, as a function of the amounts of (ai2) and (aii) used:

| ai2 [parts by weight] | 0 | 10 | 20 | 30 | 40 | 50 | 60 | 70 | 80 | 90 | 100 |
|---|---|---|---|---|---|---|---|---|---|---|---|
| aii [parts by weight] | 100 | 90 | 80 | 70 | 60 | 50 | 40 | 30 | 20 | 10 | 0 |
| Compressive strength 40% [kPa] | 6.6* | 6.3 | 5.8 | 5.4 | 5.3 | 5.2 | 4.8 | 4.6 | 3.8 | 3.5 | 3.3 |

*Comparative product

We claim:

1. A process for the preparation of a flexible polyurethane foam having low compressive strength by reacting
   a) bifunctional or polyfunctional polyoxyalkylenepolyols and
   b) if required, low molecular weight chain extenders with
   c) organic and/or modified organic polyisocyanates, in the presence of
   d) catalysts,
   e) blowing agents
   and, if required,
   f) assistants and/or additives,
   wherein the polyoxyalkylenepolyols (a) used are a block polyoxypropylenepolyoxyethylenepolyol mixture which has a hydroxyl number of from 14 to 65, contains from 2 to 9% by weight, based on the weight of the polyoxypropylene units, of ethylene oxide units bonded in the terminal position, and was prepared by anionic polymerization, at elevated temperatures, of 1,2-propylene oxide with an initiator mixture having an average functionality of from 2.3 to 2.8 and consisting of water and glycerol and/or trimethylolpropane, and polymerization of ethylene oxide with the resulting polyoxypropylene adduct.

2. A two-stage process for the preparation of a flexible polyurethane foam having low compressive strength, wherein
   1. in a first reaction stage, 1,2-propylene oxide is polymerized with an initiator mixture having an average functionality of from 2.3 to 2.8 and consisting of water and glycerol and/or trimethylolpropane, in the presence of at least one basic catalyst, at elevated temperatures, and ethylene oxide is polymerized with the resulting polyoxypropylene adduct, in an amount such that the resulting block polyoxypropylenepolyoxyethylenepolyol mixture has a hydroxyl number of from 14 to 65 and contains from 2 to 9% by weight, based on the weight of the polyoxypropylene units, of ethylene oxide units bonded in the terminal position, and
   2. in a second reaction stage,
      a) the resulting block polyoxypropylenepolyoxyethylenepolyol mixture and
      b) if required, low molecular weight chain extenders are reacted with
      c) organic and/or modified organic polyisocyanates
      in the presence of
      d) catalysts,
      e) blowing agents
      and, if required,
      f) assistants and/or additives.

3. A process as claimed in claims 1 or 2, wherein the block polyoxypropylenepolyoxyethylenepolyol mixture has a hydroxyl number of from 14 to 40 and contains from 3 to 8% by weight, based on the weight of the polyoxypropylene units, of ethylene oxide units bonded in the terminal position.

4. A process as claimed in claims 1 or 2, wherein the initiator mixture for the preparation of the block polyoxypropylenepolyoxyethylenepolyol mixture consists of a mixture of water and glycerol and/or water and trimethylolpropane in a molar ratio of from 2.3:1 to 1:4.

5. A process as claimed in claims 1 or 2 wherein the initiator mixture for the preparation of the block polyoxypropylenepolyoxyethylenepolyol mixture consists of a water/glycerol mixture in a molar ratio of from 2.3:1 to 1:4.

6. A process as claimed in claim 1, wherein the bifunctional or polyfunctional polyoxyalkylenepolyols (a) used are a mixture which contains, based on the total weight of (a),
   ai) from 10 to 60% by weight of a block polyoxypropylenepolyoxyethylenepolyol mixture which has a hydroxyl number of from 14 to 40, contains from 3 to 8% by weight, based on the weight of the polyoxypropylene units, of ethylene oxide units bonded in the terminal position and was prepared by anionic polymerization, at elevated temperatures, of 1,2-propylene oxide with an initiator mixture having an average functionality of from 2.3 to 2.7 and consisting of water and glycerol and trimethylolpropane or of water and glycerol or trimethylolpropane, and polymerization of ethylene oxide with the resulting polyoxypropylene adduct, and aii) from 40 to 90% by weight of at least one bi- and/or trifunctional polyoxypropylenepolyoxyethylenepolyol having a hydroxyl number of from 20 to 70.

7. A process as claimed in claims 1 or 2, wherein the organic or modified organic polyisocyanates or organic and modified organic polyisocyanates (c) used are: mixtures of diphenylmethane 4,4'- and 2,4'-diisocyanate, mixtures of diphenylmethane diisocyanates and polyphenylenepolymethylene polyisocyanates containing not less than 35% by weight, based on the total weight, of diphenylmethane diisocyanates, mixtures of diphenylmethane 4,4'- and 2,4'-diisocyanate and mixtures of toluylene 2,4- and 2,6-diisocyanate, mixtures of diphenylmethane diisocyanates and polyphenylpolymethylene polyisocyanates and mixtures of toluylene 2,4- and 2,6-diisocyanates, urethane-containing polyisocyanate mixtures having an NCO content of from 28 to 14% by weight, based on the total weight, and derived from diphenylmethane diisocyanates, or mixtures of diphenylmethane diisocyanates and polyphenylpolymethylene polyisocyanates.

8. A process as claimed in claims 1 or 2, wherein water is used as the blowing agent (e), in an amount of from 0.1 to 8 parts by weight per 100 parts by weight of the polyoxyalkylenepolyols (a).

9. A novel block polyoxypropylenepolyoxyethylenepolyol mixture which has a hydroxyl number of from 14 to 65, contains from 2 to 9% by weight, based on the weight of the polyoxypropylene units, of ethylene oxide units bonded in the terminal position and is prepared by anionic polymerization, at elevated temperatures, of 1,2-propylene oxide with an initiator mixture having an average functionality of from 2.3 to 2.8 and consisting of water and glycerol and trimethylolpropane or of water and glycerol and trimethylolpropane, and polymerization of ethylene oxide with the resulting polyoxypropylene adduct.

10. A novel polyoxyalkylenepolyol mixture containing
ai) from 10 to 60% by weight of a block polyoxypropylenepolyoxyethylenepolyol mixture as claimed in claim 9 and
aii) from 40 to 90% by weight of at least one bi- and/or trifunctional polyoxypropylenepolyoxyethylenepolyol having a hydroxyl number of from 20 to 70,
the percentages being based on the total weight.

* * * * *